INVENTORS
JAMES JURSIK,
RICHARD SHAW Jr.,
JOHN E. WARD
BY
ATTORNEYS

United States Patent Office 3,054,304
Patented Sept. 18, 1962

3,054,304
VARIABLY-COUPLED DAMPER-STABILIZED SERVO (DUAL-MODE DAMPER STABILIZER SERVO SYSTEM)
James Jursik, Cleveland, Ohio, John E. Ward, Lexington, Mass., and Richard Shaw, Jr., Mahwah, N.J., assignors to the United States of America as represented by the Secretary of the Air Force
Filed Dec. 5, 1957, Ser. No. 700,921
3 Claims. (Cl. 74—574)

Our invention relates to stabilizers and more particularly to viscous-coupled-inertia damper stabilizing devices for controlling servomechanisms. The invention is ideally suited for improving synchronizing performance in damper-stabilized servos such as Synchro Data Repeaters.

Positional servos employing inertia-damper stabilization have been used extensively with data repeaters for flight instrumentation and other purposes. This type of stabilization has several advantages; very high velocity and torque constants may be obtained along with smooth and reliable operation; the servo compensation is not sensitive to changes in A.-C. supply frequency; and because the amplifier is a conventional A.-C. type, zero-drift systems can be constructed.

The major disadvantage of inertia-damper stabilization has been that system transient response deteriorates rapidly for inputs which cause the system error to exceed the linear range, which is quite small because of the high static system gain. This deterioration is brought about primarily by energy storage in the damper inertia during periods of nonlinear operation. Although a damper-stabilized repeater can be designed so that it always operates in the linear range during normal follow-up operation, the transient following any large change in input position which causes the repeater to slew is usually quite severe, and may limit the usefulness of the repeater in certain applications.

The response of an inertia-damper stabilized servo to step inputs which produce large error signals is inherently poor because of the narrow proportional range of operation and the large effective inertia coupled into the system.

Servo-motors of systems for remote positioning of load devices have a pronounced tendency to hunt about the synchronized position. Various anti-hunt systems have been utilized or attempted to eliminate this hunting or oscillation. Mechanical damping devices such as the viscous-coupled-inertia damper have been effective in reducing this hunting under certain conditions, i.e., small-step response. Improved large-step response has been obtained by coupling the damper to the motor with a slip clutch, but clutch torque adjustment was found to be critical.

Significant improvement in large-step response can be obtained by disconnecting and reconnecting the damper to the system at the proper time.

The object of this invention is to improve large-signal performance of an instrument servomechanism employing inertia-damper stabilization by variably coupling the stabilizing damper.

Another object of this invention is to provide means for decoupling the damper during high signal input to prevent the damper from storing up energy which, when the null point is reached, would cause large amplitude oscillations (hunting).

Another object of this invention is to provide electronically controlled means for declutching the damper from the servomechanism to permit acceleration without hindrance.

Another object of this invention is to provide means for improving large signal performance by electronically controlling the servomechanism so that the clutch which controls the damper will be responsive only to high input signals.

Another object of this invention is to improve response to large-step inputs by providing means for clutching and declutching the servomechanism at the proper moment.

As used herein normal operation means operating conditions wherein the servo system operates with the damper shell rigidly coupled to the motor shaft; slip clutch operation means operating conditions wherein the servo system operates with the damper shell coupled to the motor shaft by a slip clutch with a torque setting reduced below the stall torque of the motor; dual-mode operation, which is the subject of this invention means operating conditions wherein the servo system operates with the damper shell rigidly coupled or completely decoupled from the motor shaft by means of a clutch depending on the electrical signal to a solenoid which operates the clutch.

Experimentation with servomechanisms under various conditions has shown that for small-step inputs normal operation gives the best results and for intermediate steps slip clutch operation gives response superior to both normal and dual-mode operations. However, response of the dual-mode system for intermediate steps can be improved by reduction of solenoid transient time.

Both dual-mode and slip clutch operations offer great improvement over normal operation for large steps. Although the slip clutch system is considerably simpler than the dual-mode system, sensitivity of the slip clutch system to variations in clutch torque setting leaves some doubt as to its reliability, i.e., a small decrease in coupling torque can make the system highly oscillatory or even unstable.

It is apparent, therefore, that the dual-mode system offers the best approach to improvement of over-all performance of damper stabilized servos, since it gives excellent response for large signals, without affecting the normal response to small signals.

The problem of improving over-all system response is essentially one of obtaining a more desirable response to large errors without substantially changing the response to small error signals. Since the poor response to large error signals is due to the damper slug inertia which is viscously coupled into the system, one solution to the problem of improving system response to step inputs of position is to decouple the damper from the motor when large error signals exist and to re-engage the damper when the system returns to the linear range of operation. Decoupling of the damper allows the motor to accelerate rapidly to full slew velocity, and recoupling of the damper, upon reaching the linear range, tends to act as a brake on the motor and prevent excessive overshoots.

These and other characteristics and objects of the invention will be understood upon reference to the following detailed description of the embodiments illustrated in the accompanying drawings wherein.

Figure 2:
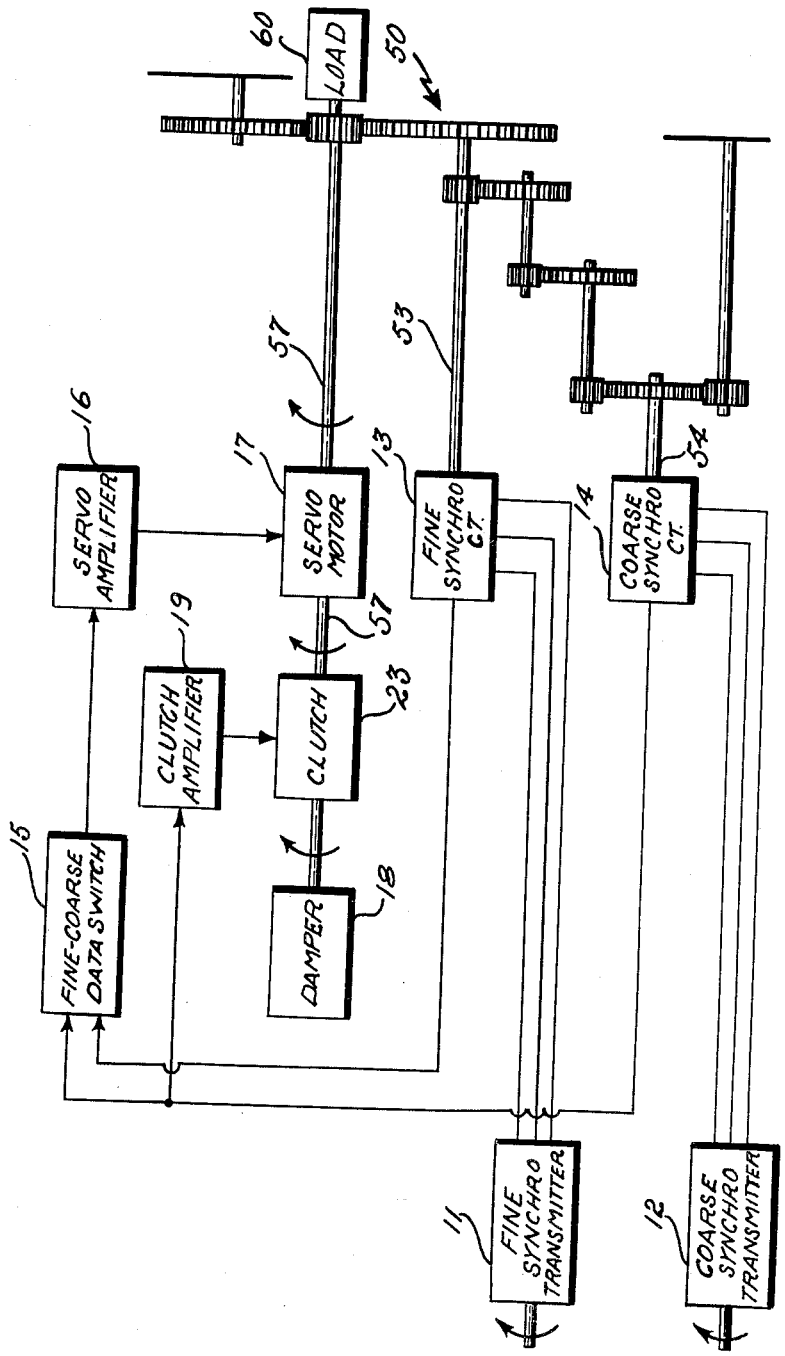
FIG. 2 shows a functional diagram of the damper stabilized synchro data repeater servo with dual-mode control.

Referring now to FIG. 2, the system comprises a remote fine synchro 11 and a remote coarse synchro 12 which are connected electrically to similar control synchros 13 and 14 respectively. The shafts 53 and 54 of synchros 13 and 14 respectively are mechanically connected to the load device 60 and servo-motor 17 by suitable gearing 50. In operation any deviation of the angular position of the load device from the position called for by transmitter synchros 11 and 12 results in a voltage output from the control synchros 13 and 14 which through the fine-coarse data switch 15 and amplifier 16 cause the servo-motor 17 to drive the load into positional correspondence with the transmitter synchros 11 and 12. With such a positioning system the servo-motor 17 tends to oscillate back and forth (hunt) about the synchronized position. In accordance with our invention such hunting is prevented by the provision of an electro-mechanical damping system consisting of a viscous-coupled-inertia damper 18, a clutch 23, and a clutch-controlling solenoid 30, which is controlled by clutch amplifier 19 which is a simplified thyratron control circuit, a high speed relay circuit, or a saturable reactor circuit, which circuits are well known to those skilled in the art of electronic controls.

The thyratrons are actuated by the error-magnitude signal produced by two phase-sensitive detectors and an adding circuit. Dependable thyratron control (and thus solenoid actuation) is obtained by taking advantage of a characteristic of neon lamps, the drop in voltage across the lamp when it begins to conduct. This property is used to sharply change the thyratron grid bias condition at the point where actuation or de-energization is desired. With this circuitry it is possible to obtain near maximum plate conduction time for the minimum error magnitude signal necessary to cause thyratron conduction.

Figure 1:
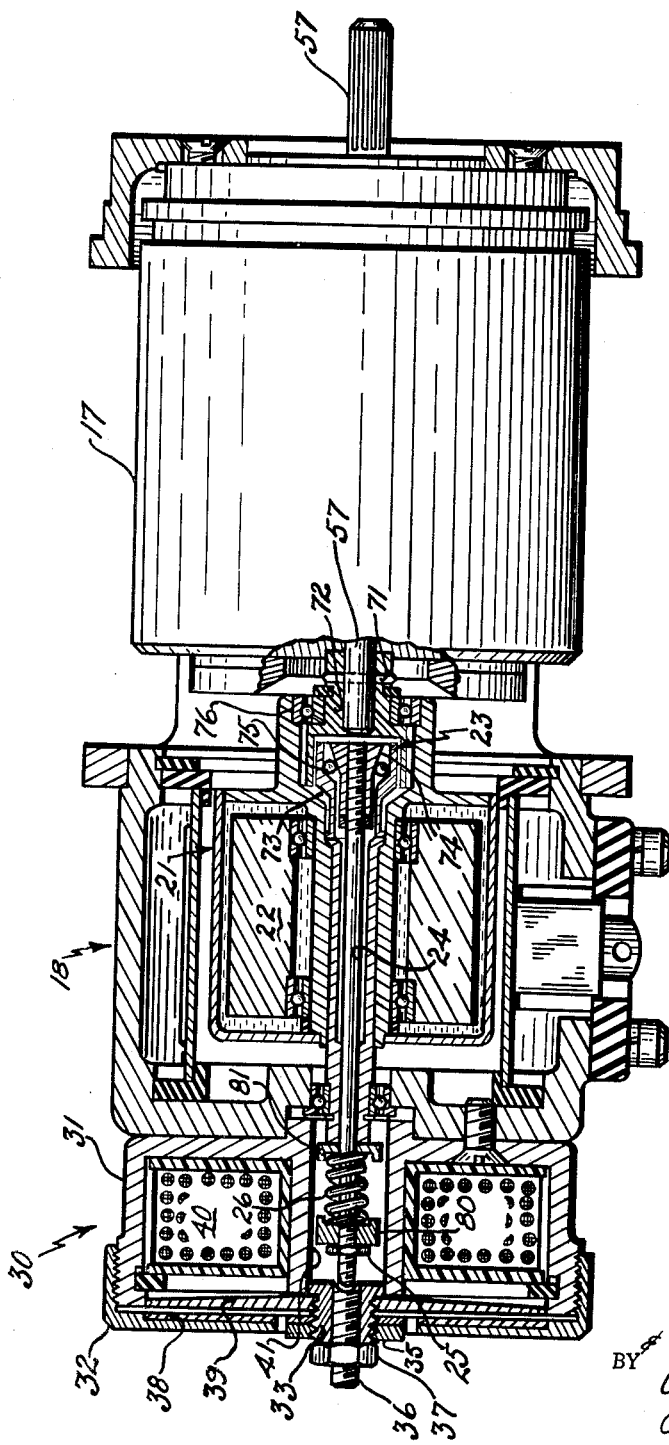
FIG. 1 shows the servo-motor with the improved damper system.

Now referring to FIG. 1 the viscous damper 18 consists essentially of a heavy slug 22 which is coupled by a viscous fluid to the damper shell 21 which is adapted to have rotational force applied thereto by way of a motor-driven clutch drum member 72 when collet 73 is pressed against drum 72 by the expanding action of ball members 75 against the collet which is caused by the conical clutch actuator element 74 carried on the inner end of reciprocal push-pull rod 24. Collet 73 is secured at one end, as shown in FIGURE 1, to the damper shell 21. Rod 24 also carries an adjusting nut 25 which controls the compression on spring 26 housed between retainers 80 and 81.

Solenoid 30 is designed to produce a large force through a short stroke and essentially consists of case 31 with a threaded cover 32, and coils 40 which operate armature disc 39, which is suspended on disc type diaphragm 38, which is preferably but not necessarily made of a magnetic material. The diaphragm 38 and the armature disc 39 are clamped together at their centers by sleeve 33 and lock nut 35. Sleeve 33 is longitudinally slideable in recess 41 and acts on pushrod 24 by means of screw 36, which is adjusted for minimum clearance with pushrod 24 when solenoid 30 is unenergized. Once adjusted, screw 36 is locked by means of locknut 37.

The servo amplifier 16 is a conventional A.-C. amplifier, well known to those skilled in the art, consisting of two stages of voltage amplification followed by a phase inverter, and a push-pull power stage.

The fine-coarse data switch 15 consists of a neon lamp circuit or relay switching circuit and such switching circuits feed either coarse or fine error voltage into the amplifier 16 depending on the magnitude of the error voltages being fed into the fine-coarse data switch.

At small error signals, the solenoid does not actuate and the coupling rod 24 remains in its leftward position, to which it is biased by the action of spring 26. In this position, conical clutch actuator 74 and thrust balls 75 expand the collet 73 against clutch drum member 72 in a locked relationship, thereby causing a driving engagement of the hub of damper shell 21 through the collet 73, clutch drum 72, to motor shaft 57, since pin 71 connects drum 72 with shaft 57. The coupling device, together with the damper have low inertia; are simple and reliable in construction, have positive drive characteristics and do not load the motor or damper bearings or otherwise add friction to the system.

When coarse error signals exceed a preset level at the clutch amplifier 19 the solenoid 30 is actuated, causing sleeve 33 to slide longitudinally into recess 41, pushrod 24 actuates clutch 23 immediately, completely disconnecting the damper shell 21 from motor shaft 57 and motor 17 has maximum possible acceleration. Damper shell 21 is supported on driving cup 72 by bearing 76 when clutch 23 is disengaged. As the null point is approached, the coarse error signal is reduced, solenoid 30 is deactivated thereby clutching the damper at the proper moment acting as a brake on motor 17 and hence settling time and overshoot are reduced.

By clutching and declutching at the proper moment in dual-mode operation in accordance with our invention, settling time can be reduced by a factor of 5.8 and overshoot can be reduced by a factor of 200 as compared to normal operation.

The embodiment of the invention described operates the system on the basis of error magnitude, however, those skilled in the art can obtain additional improvement in response characteristics by operating the system on the basis of error rate as well as error magnitude.

What we claim as new and desire to secure by Letters Patent is:

1. In combination a servo-motor having a drive shaft, a load driven by said shaft, a motor damping means, clutch means having elements coupled to said drive shaft and said damping means, electromagnetic means operable under only two conditions, said electromagnetic means being in engagement with said elements of said clutch means for effecting a positive coupling between said clutch elements to engage said damper with said shaft under one condition and being disengaged from said elements to disengage completely said damper from said shaft under a second condition, voltage generating means connected with said load and said servo-motor for generating a voltage proportional to the angular deviation of said load from a predetermined angular position, and means connected with said voltage generating means and said electromagnetic means for causing operation of said electromagnetic means in each of its two conditions in response to predetermined voltage levels from said voltage generating means.

2. In combination a servo-motor having a drive shaft for rotation about an axis, a load driven by said shaft, a viscous-coupled-inertia damper having an inertia slug and a damper shell mounted to rotate about the axis of rotation of said shaft, a viscous coupling between said slug and said shell, a collet type friction clutch coaxially mounted about said shaft and having elements connected to said shaft and said damper shell for effecting engagement of said damper shell to said shaft, a pushrod mounted in alignment with said shaft and coupled to said clutch for effecting engagement of said clutch, a compression spring coaxially mounted on said pushrod with means acting on said spring for adjusting the compression on said spring and consequent clutch torque, a solenoid operable under only two conditions and being capable of producing a large force through a short stroke, said solenoid being mounted in alignment with and proximate to said pushrod for operation thereof, voltage generating means connected with said load and said servo-motor for generating a voltage proportional to the angular deviation of said load from a predetermined angular position, and means connected with said voltage generating means and said solenoid for controlling operation of said solenoid to effect positive engagement of said clutch and complete disengagement of said clutch in response to predetermined voltage levels from said voltage generating means.

3. In a servo system, a load, an electrically energized motor in driving engagement with said load, a motor-damping device, electromagnetically operated clutch means operable under only two conditions and coupled to said motor damping device and said motor for positively coupling and completely decoupling said damping device with said motor, voltage generating means coupled with said load and said motor for generating actuating voltages for energization of said motor, means connected with said voltage generating means and said electromagnetically operated clutch means for causing positive coupling and decoupling of said clutch in response to predetermined voltage levels of said voltage generating means.

References Cited in the file of this patent
UNITED STATES PATENTS

| | | |
|---|---|---|
| 653,424 | Lunt | July 10, 1900 |
| 745,327 | Churchward | Dec. 1, 1903 |
| 936,284 | Abernethy | Oct. 12, 1909 |
| 1,132,478 | Johnson | Mar. 16, 1915 |
| 1,963,638 | Wilsing | June 19, 1934 |
| 2,386,402 | Lilja | Oct. 9, 1945 |
| 2,454,980 | Sobell | Nov. 30, 1948 |
| 2,520,177 | Stoops | Aug. 29, 1950 |
| 2,576,105 | Childs | Nov. 27, 1951 |
| 2,611,464 | Rabe | Sept. 23, 1952 |
| 2,666,509 | Jaggi | Jan. 19, 1954 |
| 2,770,743 | Wallach | Nov. 13, 1956 |
| 2,796,222 | Frankel | June 18, 1957 |
| 2,828,845 | Thornton | Apr. 1, 1958 |